Aug. 3, 1965  U. ADAMS  3,197,909
FISHING DEVICE
Filed July 9, 1963

INVENTOR.
UL ADAMS
BY Shanley & O'Neil
ATTORNEY 3,197,909
FISHING DEVICE
Ul Adams, 1755 S. Fremont, Springfield, Mo.
Filed July 9, 1963, Ser. No. 293,807
1 Claim. (Cl. 43—42.37)

The present invention relates to weighted fishing devices, more particularly of the type of fish hooks or fish lures. When embodied in a fish lure, the device of the present invention is preferably characterized by the combination of a hook and flexible artificial bait to lure fish to the hook. Such flexible bait may be in the form of flexible appendages such as worms; in the form of feathers, strands or fibers, such as artificial flies; in the form of bodies with plural side attached appendages such as wing simulations and the like, or in the form of bodies with trailing appendages such as frogs, or other forms of flexible artificial bait.

It is an object of the present invention to provide a fishing device characterized by a weight and a hook so arranged relative to each other that the hook will not become snagged upon rocks and submerged branches or other underwater obstructions encountered when fishing.

Another object of the present invention is the provision of a fishing lure characterized by the combination of a weight and a hook and artificial flexible bait so disposed relative to each other that the artificial bait will be firmly secured to the lure and desirably positioned relative to the weight and hook.

Finally, it is an object of the present invention to provide a fishing device which will be relatively simple and inexpensive to manufacture, dependable in its results, and rugged and durable in use.

Figure 1:
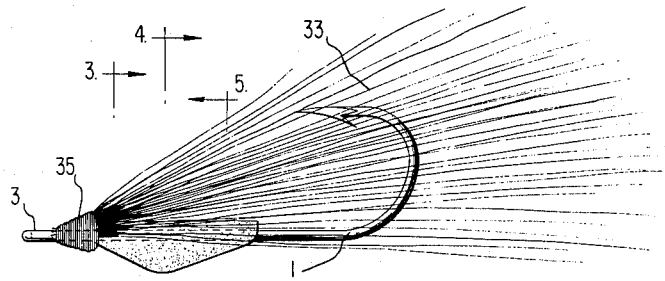
Figure 2:
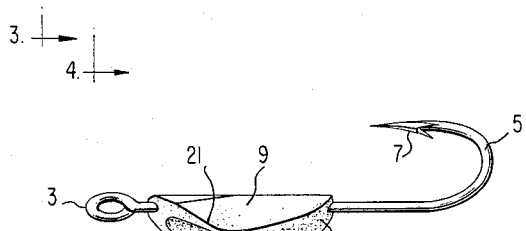
Figure 3:
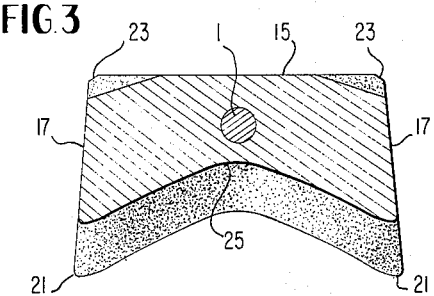
Figure 5:
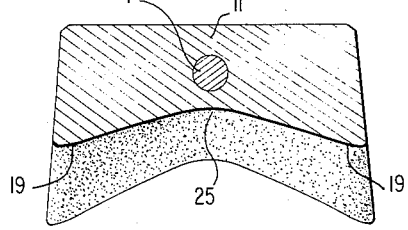
Figure 4:
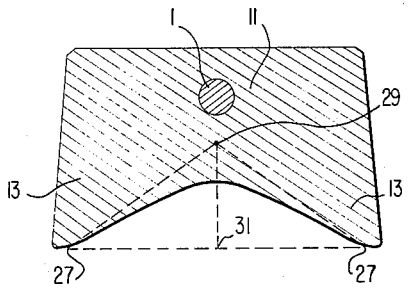

Other objects and advantages of the present invention will become apparent from a consideration of the following description taken in connection with the accompanying drawing, in which:

FIGURE 1 is a side elevational view of a fishing lure according to the present invention;

FIGURE 2 is a side view of a fishing device according to the present invention turned about 45° from the position of FIGURE 1; and FIGURES 3–5 are enlarged fragmentary cross-sectional views taken on the lines 3—3, 4—4 and 5—5, respectively, of FIGURE 1.

Referring now to the drawing in greater detail, there is shown a fishing device according to the present invention in the form of a lure having a shank 1 that has an eye 3 at one end and a hook 5 at the other end thereof. The hook 5 terminates in a sharpened end in the form of a barb 7.

A weight 9, preferably of lead, is disposed about and fixedly secured to shank 1 and is spaced both from eye 3 and from hook 5. In its preferred form, weight 9 is formed about shank 1 by casting molten metal such as lead in the desired shape of weight 9.

The shape of weight 9 is characterized by an intermediate portion 11 of reduced depth as seen in FIGURES 3–5. A downwardly extending portion 13 of weight 9 is disposed on either side of intermediate portion 11. Weight 9 is bounded upwardly by a flat upper surface 15 and laterally by flat downwardly diverging sides 17. The outer or marginal portions of the lower surface of weight 9 form a downwardly convex lower surface 19 bounded outwardly by the upwardly convex lower edges 21 of sides 17 and by the front and rear edges of upper surface 15. Sides 17 of weight 9 in turn are bounded upwardly by straight horizontal upper edges 23. Downwardly convex lower surface 19 frames or surrounds a downwardly concave lower surface 25 which is smaller than and disposed within downwardly convex lower surface 19. The underside of weight 9 is thus of complex curvature.

Downwardly extending portions 13 of weight 9 terminate downwardly in lowermost points 27 that are spaced apart from each other a distance substantially greater than they are spaced below the center of gravity 29 of the lure. Center of gravity 29, in turn, is spaced a substantial distance below shank 1, all as best seen in FIGURE 4. As is also best seen in FIGURE 4, the distance from center of gravity 29 to point 31 is the distance by which points 27 are spaced below center of gravity 29; and an inspection of FIGURE 4 shows that this distance is in fact substantially less than the distance between points 27 as seen in FIGURE 4.

Artificial bait 33 is secured to shank 1 between eye 3 and weight 9. In the illustrated embodiment, the artificial bait is in the form of flexible strands simulating a fly so that the lure shown in FIGURE 1 is a "wet" fly in the sense that it sinks, as distinguished from a "dry" fly that floats. Artificial bait 33 is secured to shank 1 by means of binding 35, which "ties" the fly. The eye 3 and the end of weight 9 adjacent eye 3 thus provide abutment shoulders for retaining binding 35 properly in place.

It will be observed that the position of the device shown in FIGURES 3–5 is the equilibrium rest position by virtue of the fact that center of gravity 29 is disposed below shank 1. In this position, hook 5 will always be up, so that as the device is drawn past obstacles such as rocks and submerged branches and the like, there will be a minimum opportunity for hook 5 to catch and snag on obstacles. Moreover, the device will have a great degree of stability in this equilibrium rest position, because points 27 which are the lowermost points of the lure are spaced apart a distance substantially greater than the distance by which they are spaced below the center of gravity 29, as seen in FIGURE 4. The provision of downwardly concave lower surface 25, which spaces points 27 apart, is therefore useful in that not only does it reduce the weight of the lure, but also it provides in effect outwardly spaced runners or outriggers for the lure so that the stability of the lure is greatly increased. To this end, it is desirable that downwardly extending portions 13 diverge from each other, for the maximum stability of the lure is thus achieved with minimum weight. At the same time, it is desirable that the boundary surface for downwardly concave lower surface 25 be downwardly convex as at 19, so that weight 9 will pass easily over obstructions.

An inspection of FIGURE 1 shows that between lowermost points 27 on the weight and the hook end of the shank, the weight body slopes continuously upwardly toward the straight portion of the shank, and lowermost points 27 and a point on the curved portion of the shank in the neighborhood of reference number 1 in FIGURE 1 will constitute a three-point support for the entire device as it moves along the bottom. The wide spacing of these three points makes for a very stable equilibrium position of the device.

In addition to providing a firm and convenient location for the attachment of artificial bait, the mounting of the bait on the device of the present invention as seen in FIGURE 1, in combination with the relationship of the hook and the weight to each other, assures that the artificial bait will be maintained on the same side of the weight as is the hook. The artificial bait is thus constrained by the weight to mask the hook, so that the effectiveness of the artificial bait is greatly increased as compared to the situation in which the artificial bait is free to swing to either side of the shank. To this end, therefore, it is preferable that upper surface 15 of the weight not be curved very much downwardly toward lower edges 21 or otherwise rounded, so that upper surface 15 can continue to perform its desirable function of correctly locating artificial bait 33.

From a consideration of the foregoing description, therefore, it will be evident that all the initially recited objects of this invention have been achieved.

Although the present invention has been described and illustrated in connection with preferred embodiments, it is to be understood that modifications and variations may be restored to without departing from the spirit of the invention, as those skilled in this art will readily understand. Such modifications and variations are considered to be within the purview and scope of the present invention as described by the appended claim.

What is claimed is:

A fish hook comprising a shank, a hook formed on one end of the shank and extending to one side of the shank and an eye at the other end of the shank, a weight on the shank contiguous to the eye and remotely spaced from the hook end of the shank, the weight having spaced portions, the center of gravity of the weight being disposed on the side of the shank opposite the hook so that the opposite side is the lower side of the fish hook in an equilibrium rest position of the fish hook, the spaced portions of the weight being the lowermost portions of the weight relative to the shank and constituting two support points widely spaced apart one on either side of the center of gravity of the weight on the side of the shank opposite the hook and being disposed below the center of gravity of the weight a distance substantially less than the distance between said lowermost portions, the weight having an intermediate portion between but above said lowermost portions, the shank adjacent the eye being fixedly embedded in said intermediate portion, the lower surfaces of the weight receding continuously upwardly from the two support points and away from a plane defined by the two support points and a third point located on the lower side of the hook end of the shank, the third point being the point at which the plane is tangent to the lower side of the hook end of the shank, the spacing of the center of gravity of the weight from the hook end of the shank and the shape of the underside of the weight being such that said two support points of the weight and said third point form three points of support for the hook in said equilibrium rest position, and flexible artificial bait fastened to the shank between the weight and the eye and extending toward the hook along the upper surface of the weight.

References Cited by the Examiner

UNITED STATES PATENTS

| | | | |
|---|---|---|---|
| 549,842 | 11/95 | Cable | 43—42.25 |
| 1,986,738 | 1/35 | Mitchell | 43—42.38 |

SAMUEL KOREN, *Primary Examiner.*

ABRAHAM G. STONE, *Examiner.*